Patented June 30, 1942

2,288,321

UNITED STATES PATENT OFFICE 2,288,321

MOLDABLE COMPOSITION AND MOLDED ARTICLE AND METHOD OF MAKING THE SAME

Birger W. Nordlander and Ira A. Hurst, Schenectady, N. Y., assignors to General Electric Company, a corporation of New York No Drawing. Application September 27, 1939, Serial No. 296,814

8 Claims. (Cl. 260—40)

This invention relates to moldable compositions and molded articles and to methods of making the same. The invention is especially concerned with such products made with alkyd resins. As is well known, alkyd resins include all those complexes resulting primarily from the interreaction of a polyhydric alcohol, such as glycerine, and a polybasic acid or its anhydride, such as phthalic acid or its anhydride.

It is an object of the present invention to prepare moldable compositions and molded articles which, utilizing alkyd resin alone or modified with other synthetic or natural resin as binding agent, will set hard and firm upon heating in a mold, and which, like the straight phenolic resin molding compounds, may be ejected (after finished cure) hot from the mold without distorting.

Another object of the present invention is to provide products of the kind described that have surface finish, hardness, toughness, tensile strength, heat, water and solvent-resistance of a high order, and outstanding arc-resistance.

Another object of the present invention is to provide products of the kind described having high creepage-resistance, that is, having practically no tendency to "track" or carbonize when an arc is allowed repeatedly to shoot across their surface.

A further object of this invention is to provide a convenient and economical method or process for making products of the stated kind.

The foregoing objects are attained in accordance with the present invention by using an acidic alkyd resin and by incorporating with such resin, while in "A" (uncured) stage, an "active" filler such as asbestos and an active polybasic metallic oxide, considerably in excess of the amount which may be calculated on the basis of the acid value of the resin used.

Alkyd resins heretofore have not been utilized with any commercial success in making molded articles by the hot mold process. This is because conversion of such resins to the insoluble, infusible state by the continuation of the condensation process leading to the formation of these resins is very slow as compared with other resins (for example, urea-formaldehyde and phenol-formaldehyde resins) commonly used for this purpose.

It has been known heretofore that the hardening of alkyd resins may be hastened by adding to the resin substances such as calcium oxide, zinc oxide, magnesium oxide or finely divided zinc or iron. For example, in United States Patent No. 1,581,902, issued April 20, 1926, to James G. E. Wright, and assigned to the same assignee as the present invention, such substances are designated as "dehydration catalysts" and it is suggested that the accelerating effect may be due to the formation of "some sort of loose chemical compound which splits off water more easily than the reacting compounds." The addition of basic substances, such as zinc oxide, calcium oxide, barium carbonate, barium hydroxide and the like, to alkyd resins to lower the temperature of solidification also has been suggested (see, for example, Ellis United States Patent No. 1,897,977).

The present invention resides in our discovery that, in order to obtain products having characteristic properties such as set forth under the objects of our invention, it is necessary to use an acidic alkyd resin and to maintain a predetermined relationship between the resin and the active metallic oxide employed. In all cases the active metallic oxide component must be considerably in excess of that which may be calculated as being necessary to form the corresponding metallic salt of the free organic acid present in the acidic alkyd resin. A second condition, which it is necessary to fulfill in order to obtain the results heretofore described, is that the percentage proportion of resin plus metallic oxide in the molding compound bears a certain predetermined relationship to the amount of filler employed when such filler is of the "active" type as will be more fully described later. These relationships are determined empirically, and vary as the component materials and the properties particularly desired in the end-products are varied.

In order that our invention better may be understood by those skilled in the art to which it relates, the following specific examples thereof are given:

Example I

| Formula | Parts by weight |
|---|---|
| Alkyd resin (A-stage) | 35.7 |
| Mica dust (20 mesh) | 50.0 |
| Zinc oxide | 14.3 |

This alkyd resin advantageously may be that produced by reacting 2 moles of glycerol with 3 moles of phthalic anhydride until an acid value of 125 to 150 has been reached.

Using a suitable heated mixing device, such as a Banbury mixer or a pair of rolls such as used for mixing rubber compositions, the above components are compounded according to the following technique, which our experiments have shown produces the best results.

Keeping the temperature of the mixer at or above the softening point of the resin, the resin is first introduced therein. When this has melted, the filler, in the example mica dust, is added and thoroughly incorporated with the melted resin. Upon completion of this step, the oxide, in this particular case zinc oxide, is added. While a slow setting-up effect is noticeable during the preceding steps, a very rapid hardening effect commences as soon as the oxide has been added, the mixture becoming increasingly stiff. The milling is continued sufficiently long to insure a good distribution of the oxide in the mixture. At the end of this operation, the compound is taken from the rolls in the form of a stiff sheet or removed from the Banbury mixer in the form of a lumpy mass. The resulting product is subsequently ground into a powder.

When ordinary mixing rolls are used in compounding the molding mixture, the rolls are held at a temperature slightly above the melting point of the resin, which in general is between 100° C. and 130° C., and adequate mixing of the resin, filler and oxide may be obtained from a total rolling time of the order of 5 to 10 minutes, although with some resins a slightly longer rolling time may be necessary. However, when a Banbury mixer is employed both a higher temperature and longer mixing time are required primarily because of the different nature of the two mixing devices. On the average the temperature of the Banbury mixer proper should be about 50 degrees above the melting point of the resin and the mixing time increased to 25 to 40 minutes. The closer contact between the rolls and the composition and the more drastic mixing action of the rolls probably account for the different time and temperature requirements of the two devices. It is to be understood that other suitable mixers may be used with corresponding adjustment of the mixing time and temperature. Unless otherwise indicated, all figures given hereinafter are based on the use of rolls in carrying out our process.

It is important that the compounding be carried out as described above, so that the filler is thoroughly coated with the resin before the reactive oxide is added. If the components are introduced in a different order, the physical characteristics of the product, such as water resistance and tensile strength, are lowered considerably.

The product obtained by the aforedescribed technique may be used directly as a molding compound. However, depending upon the type of resin used, it may be advantageous first to give it a pre-curing treatment. By such treatment we have found it possible to obtain optimum physical properties in the molded product without having to cure the compound for a prolonged time in a mold. In the cited example the best results were obtained when the compound was pre-cured for 5 hours at 150° C. or for 10 hours at 125° C. and kept in the mold for about 10 minutes at 150° C.

The proper period of pre-cure depends greatly on the particular resin and filler used and must be determined empirically for every different combination. To illustrate this point we may cite the following observations. Using the same formula and technique as in the foregoing example, but substituting an "active" filler, such as asbestos, for mica, 2 hours' pre-cure at 125° C. and 5 minutes' cure at 150° C. in the mold produced the best results. Shorter or longer pre-cure gave markedly poorer products. The reason for this behavior, which is typical for these materials, is most likely the following. If the pre-cure is too short, the resin is not sufficiently converted and the product therefore remains mechanically weak and sensitive to moisture. On the other hand, an entirely different condition is responsible for the inferior results which are obtained when the pre-cure is too long. No doubt, the longer the pre-cure, the more converted and the more inert the material becomes. However, the more slow-flowing it will also get and therefore the more difficult it will be to obtain a dense piece on molding. As a consequence porosity develops, and it is this condition which is responsible for the higher water absorption and the lower tensile properties exhibited by the overly pre-cured products.

The fact that the requisite pre-cure is so much dependent on the type of filler used signifies that the filler itself, if in possession of proper and sufficiently active groups, participates in the conversion of the resin. Thus the widely different behavior exhibited for instance by asbestos and mica is most likely due to the fact that the hydroxyl or oxide groups in asbestos are much more chemically reactive than those present in mica and sufficiently so to react with the acid groups in the resin component.

For most purposes the product resulting on completion of the molding cycle possesses the required properties to the extent that it may find application as such. However, if for any reason an improvement in the properties proves necessary or desirable (for example, an increase in heat resistance), an after-cure may be given the molded piece without distorting its dimensions, by keeping it in an oven at 125° to 150° C. until the desired improvement has been effected.

The products which may be prepared according to the process aforedescribed have shown remarkable properties in respect to surface finish, hardness, toughness, tensile strength, arc resistance, creepage resistance, heat resistance, water resistance and solvent resistance. The arc resistance and creepage resistance are of outstanding order. Of particular value in the electrical insulation field is the fact that the material is completely lacking any tendency to "track," that is, no noticeable carbonization occurs when an arc is repeatedly allowed to shoot across the surface. In consequence of this, the creepage of current along the arced path is negligible. This is in striking contrast to the products made from phenolic molding compounds which, as is well known, readily "track." The water resistance for a resin of this type is of such high order that it deserves special mention. Thus the molded pieces obtained as described under Example I showed the following low water absorption figures at room temperature:

|  | Percent by weight |
|---|---|
| After 50 hours | 0.15 |
| After 100 hours | 0.25 |
| After 500 hours | 0.68 |
| After 1000 hours | 1.00 |

Of course, variations in the described process, both in respect to proportions of components, type of resin, active oxide and filler, are within the scope of this invention. Thus, acidic alkyd resins other than straight glycerol phthalate, for instance the acidic fatty oil acid modified alkyd resins or those falling under the class commonly called "plastic alkyd resins," may be used. The resin should have an acid value above that at which gelation takes place when the reaction is carried further towards completion of the esterification reaction. In general the acid value should be at least 125 although the preferred value will depend on the particular type and proportion of the reactants used. Other oxides than zinc oxide may be employed, although such oxides as calcium oxide, magnesium oxide and barium oxide yield products inferior in respect to water resistance, due to the hydrophilic nature of the corresponding phthalates, succinates, adipates, etc. The analogous zinc and lead salts are water insoluble and the corresponding metal oxides therefore are most suitable when high water resistance is desirable.

An acidic resin prepared from pentaerythritol and phthalic acid is particularly useful in making these hot-moldable compositions, possibly because such a resin is more highly polyfunctional than a corresponding glycerol resin. That is, for a given degree of reaction, the molecules constituting the tetrahydric alcohol resin will on the average have more free acidic groups than those comprising the glycerine resin. As an example, a resin prepared from one mole of pentaerythritol and two moles phthalic anhydride reacted to an acid value of 164 may be employed in accordance with the following formula:

*Example II*

| Formula | Parts by weight |
| --- | --- |
| Pentaerythritol resin | 35.7 |
| Mica dust | 14.3 |
| Zinc oxide | 50.0 |

As the pentaerythritol resin cures much faster than the corresponding glycerol resin of Example I, it may prove desirable to mix the powdered resin and mica dust before these ingredients are put on the rolls or in the Banbury mixer and add the zinc oxide as soon as a good coverage of fused resin on the filler is obtained. After compounding is complete, in the present example, after a total time on the rolls at about 115° C. of from 5 to 7 minutes of which 2 or 2½ minutes are used in mixing the zinc oxide, the product is removed and ground into a powder. In contrast with the corresponding glycerol-phthalate resin compound, this product requires only one hour pre-cure at 125° C. to give a satisfactory product upon molding for 10 minutes at 150° C. The pentaerythritol-phthalate resins in general give much harder products than the glycerol-phthalate resins. The hardness increases, within practical limits, as the ratio of zinc oxide to resin is increased. A ratio of not less than 0.25 part zinc oxide to 1 part resin is preferred.

Although resins prepared from dihydric alcohols and dibasic acids are not preferred for the practice of our invention, they can be employed if the dibasic acid or anhydride, such as phthalic acid or anhydride, is taken in excess of the stoichiometrical amount of dihydric alcohol, such as glycol, used. The mole ratio of dibasic acid or anhydride to dihydric alcohol should approach 2:1 so that sufficient free carboxyl groups will be present to react with the polybasic metallic oxide and thus allow the resin molecules to propagate into long chains. In general, resins prepared from alcohols having three or more hydroxyl groups in the molecule and at least stoichiometrical portions of polybasic acids having two or more carboxyl groups are preferred.

In determining the proper balance between the acidic alkyd resin and the basic oxide and filler, certain general aspects should be considered. From the point of view of molding practice, a satisfactory hot-molding compound should flow freely during the earlier part of the molding cycle and, subsequently, cure rapidly, that is, become permanently set so that in a relatively short time the molded piece may be ejected hot without distorting.

In the molding compounds considered herein, made from the acidic alkyd resins, a part of the curing occurs during the compounding, another part during the precuring step, if used, and the final part in the mold during the molding cycle. By controlling the extent of the cure effected by the first step or steps, the above two requisites may be developed to a satisfactory degree in the compounds. In this connection, it is important from the standpoint of obtaining a product suitable for commercial molding operations that an adjusted proportion of resin, oxide and filler be taken. Otherwise, the compound may either flow well but cure too slowly, or flow poorly and cure too fast.

It is believed that the heat-hardening process or cure involves a reaction between acidic groups situated on the resin component and the basic groups present not only on the active oxide but also on the filler if the latter is of the "active" type. Depending on whether the filler is "inactive" or "active," the cure of the compound will therefore be governed by different relationships. When an inactive filler is used, there can be only one regulating factor of significance, namely, the ratio of the oxide to the resin, since the filler then acts merely as a diluent. This ratio will depend upon the type of resin and the kind and subdivision of the oxide. In general, when zinc oxide is employed with an inactive filler, the presence of from 15 to 60% of the oxide based on the weight of the acidic resin will yield satisfactory molding compositions. However, a content above 25% is preferred. With such higher proportion of oxide a better flow and a harder cure are obtained. When lead and calcium oxides are used in place of the zinc oxide or in combination with the zinc oxide, these proportions are correspondingly lower since both the calcium and lead oxides, on the whole, have been found to be more reactive than zinc oxide. In this connection I have found that the activity of various commercial grades of zinc oxides may vary. Although any of the commercial grades may be used, I prefer those known in the market as "Horsehead XX103" and "Horsehead XX55." It is sometimes desirable to add the required calcium or lead oxide to the powdered or ground material just before subjecting this material to the molding operation.

A somewhat different situation exists when an active filler is used. Since both the oxide and the filler then participate in the conversion of the resin, it is possible with given types of resin, oxide and filler to make many different combinations all of which will give molding compounds exhibiting similar molding characteristics. With a compound containing from about 50 to 60% asbestos based on the total ingredients present, preferably from 5 to 14% zinc oxide will be used to produce the desired hardening or curing of the resin in the hot mold. It will be noted that these percentages are in terms of the total composition. Based on the resin content, the amount of active oxide used preferably will exceed 15% when asbestos is used as a filler constituting from 60 to 50% of the total composition.

It is obvious, of course, to those skilled in the molding art that the filler content of any molding composition will influence the tensile strength and other physical or electrical characteristics of the molding composition. The ingredients therefore should be so proportioned as to produce a molded article having the desired characteristics for any particular application.

Other fillers than mica or asbestos may be employed such as fibrous materials of the cellulosic type, for example, cotton flock, wood fiber, sawdust, etc., and laminated materials may be made with products of the present invention, employing so-called pre-mix technique in their utilization.

A suitable composition containing wood flour may be prepared from the following ingredients:

*Example III*

| Formula | Parts by weight |
|---|---|
| Alkyd resin (same as in Example I) | 39.6 |
| Wood flour | 43.5 |
| Zinc oxide | 16.9 |

The wood flour is rolled at 110° C. with the melted resin for about 5 minutes, after which the zinc oxide is added and mixing continued for an additional 5 minutes. After a pre-cure of 3 hours at 125° C., a very good cure is obtained when the product is molded at a temperature of 150° C. for 5 minutes. Although the transverse strength of the molded product is very good, the arc resistance is not as good as that obtained by the use of asbestos instead of wood flour.

During the curing of the molding compounds of this invention, water is formed. This must find its way out of the compound by diffusion. It has been found possible to shorten the time of cure by incorporating in the compound up to 5 per cent of a water binding agent, such as plaster of Paris, Portland cement, etc. Experiments have shown that such additions also aid the water resistance of the molded product.

We have also found that admixture with other acidic resins, such as the natural resins, shellac, copal, rosin, etc., is feasible and may be used to modify compounds made with alkyd resins. The copal-alkyd resin mixtures with active oxide and filler provide molding compounds which are especially suitable for certain hot-molding technique and applications of the product. These compositions are more fully described in a copending application Serial No. 296,815, of Birger W. Nordlander, filed concurrently herewith, and assigned to the same assignee as the present application. Suitable phenolic resins also may be incorporated, although such additions will reduce materially the arc- and creepage-resistance of the product.

On account of the unusual properties which are combined in the products of the present invention, they may be used to great advantage in the electrical insulation field, particularly in various applications where heat, water, arc and creepage resistance are prime requisites. The application of these compounds obviously is not limited to this field alone, and, in general, they may be used wherever any of the above properties, or a combination of these are required or desired.

What we claim as new and desire to secure by Letters Patent of the United States, is:

1. A composition of matter capable of being hot-molded and ejected hot from the mold and containing a filler and the reaction product of an acidic alkyd resin having an acid number of at least 125 and an active oxide of a polyvalent metal in an amount substantially in excess of 25 per cent by weight based on the weight of the alkyd resin.

2. A composition of matter capable of being hot-molded and ejected hot from the mold comprising a filler and the product of reacting an acidic alkyd resin having an acid number of at least 125 with at least 15 per cent of a reactive oxide comprising zinc oxide at a temperature above the melting point of said resin.

3. A composition of matter comprising the reaction product of a fused acidic alkyd resin having an acid number of at least 125, at least 15 per cent by weight of a polyvalent metal oxide based on the weight of the acidic alkyd resin, and asbestos.

4. A composition of matter comprising the heat reaction product of an acidic alkyd resin, asbestos and at least 15 per cent by weight of a polyvalent metal oxide based on the weight of the alkyd resin, said alkyd resin comprising the product of reacting a polyhydric alcohol containing more than two hydroxyl groups per molecule with a polybasic acid to an acid number of at least 125.

5. A composition of matter comprising the product of reaction of an acidic alkyd resin having an acid number of at least 125, from 5 to 14 per cent of zinc oxide and from 60 to 50 per cent of a fibrous asbestos filler, and containing a small amount of a water-binding agent.

6. The method of producing a composition containing an acidic alkyd resin having an acid number of at least 125 and capable of being hot-molded which comprises melting the acidic alkyd resin, mixing a filler into the melted resin, adding at least 15 per cent by weight of zinc oxide based on the weight of the resin, and continuing the mixing action for a time sufficient to completely mix the ingredients but insufficient to cause complete conversion of the resin and pre-curing the mixture at an elevated temperature prior to molding.

7. A composition of matter comprising the heat reaction product of asbestos, an acidic alkyd resin having an acid number of at least 125 and at least 15 per cent by weight of zinc oxide asbestos, based on the weight of the alkyd resin, said alkyd resin comprising the product of reacting pentaerythritol with phthalic anhydride in a mole ratio of 1:2.

8. An article of manufacture comprising the hot-molded reaction product of asbestos, an acidic alkyd resin having an acid value of at least 125 and at least 15 per cent by weight of an active oxide of a polyvalent metal based on the weight of the resin.

BIRGER W. NORDLANDER.
IRA A. HURST.

CERTIFICATE OF CORRECTION.

Patent No. 2,288,321.                                    June 30, 1942.

BIRGER W. NORDLANDER, ET AL.

It is hereby certified that error appears in the printed specification of the above numbered patent requiring correction as follows: Page 4, first column, line 47, for "inbention" read --invention--; and second column, lines 61 and 62, strike out "asbestos,"; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.